United States Patent
Mukoyama et al.

(10) Patent No.: US 7,197,813 B2
(45) Date of Patent: Apr. 3, 2007

(54) METHOD OF ACCURATE EVALUATION ON MAGNETORESISTIVE READ ELEMENT

(75) Inventors: Naoki Mukoyama, Kawasaki (JP); Kenichiro Yamada, Kawasaki (JP); Hitoshi Kanai, Kawasaki (JP); Manabu Watanabe, Kawasaki (JP); Norikazu Ozaki, Kawasaki (JP); Kazuaki Satoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 378 days.

(21) Appl. No.: 09/951,290

(22) Filed: Sep. 12, 2001

(65) Prior Publication Data

US 2002/0138970 A1    Oct. 3, 2002

(30) Foreign Application Priority Data

Mar. 30, 2001 (JP) ............... 2001-099170

(51) Int. Cl.
*G11B 5/127* (2006.01)
*H04R 31/00* (2006.01)

(52) U.S. Cl. ............... 29/603.09; 29/603.07; 29/603.13; 29/603.14; 310/324.11; 310/324.12

(58) Field of Classification Search ............ 29/603.03, 29/603.07, 603.09, 603.13, 603.14; 360/324.11, 360/324.12
See application file for complete search history.

(56) References Cited

U.S. PATENT DOCUMENTS 5,514,953 A * 5/1996 Schultz et al. ............ 324/228
6,002,553 A * 12/1999 Stearns et al. ............ 360/324
6,025,977 A * 2/2000 Hu et al. .................... 360/319
6,278,592 B1 * 8/2001 Xue et al. ............... 360/324.12
6,299,507 B1 * 10/2001 Katoh et al. .................... 451/9
6,433,972 B1 * 8/2002 Mao et al. ............ 360/324.11

FOREIGN PATENT DOCUMENTS

| JP | 60105286 A | * 6/1985 |
| JP | 60-171618 | 9/1985 |
| JP | 01266393 A | * 10/1989 |
| JP | 10-294503 | 11/1998 |

OTHER PUBLICATIONS

"GMR materials for low field applications"; Daughton, J.M.; Chen, Y.J.; Magnetics, IEEE Transactions on, vol. 29, Issue: 6 Nov 1993; pp. 2705-2710.*

* cited by examiner

*Primary Examiner*—Paul D. Kim
(74) *Attorney, Agent, or Firm*—Greer, Butns & Crain, Ltd.

(57) ABSTRACT

The magnetoresistance is measured for a magnetoresistive layered-structure, such as a spin valve film, prior to formation of an upper shield layer as well as patterning of a lower shield layer. The magnetic influence of the upper and lower shield layers can completely be eliminated during the measurement of the magnetoresistance. The magnetoresistive layered-structure is allowed to reliably receive the magnetic field over a wider range including a lower magnetic field range. It is accordingly possible to measure the magnetoresistance properly reflecting the magnetic characteristic of the magnetoresistive layered-structure. It is possible to find deficiency of a magnetoresistive read element at an earlier stage of the method.

10 Claims, 9 Drawing Sheets

METHOD OF ACCURATE EVALUATION ON MAGNETORESISTIVE READ ELEMENT

BACKGROUND OF THE INVENTION

1. Field of the Invention

The present invention relates to a method of making a magnetoresistive read element such as a giant magnetoresistive (GMR) element, a tunnel-junction magnetoresistive (TMR) element, and the like. In particular, the invention relates to a method of evaluation for a magnetoresistive read element comprising: a magnetoresistive layered-structure such as a spin valve film, a tunnel-junction film, and the like; a pair of biasing hard layers interposing the magnetoresistive layered-structure therebetween; a pair of electrically-conductive lead layers each connected to the magnetoresistive layered-structure at one end; and a pair of terminal pads each connected to the other end of the electrically-conductive lead layer.

2. Description of the Prior Art

For example, an evaluation method is well known for evaluating magnetoresistive (MR) layered-structure formed on a wafer, as disclosed in Japanese Patent Application Laid-open Nos. 10-294503 and 60-171618. The evaluation method is designed to measure the variation in the magnetoresistance of the magnetoresistive layered-structure. The magnetoresistive layered-structure is put into a magnetic field in the measurement. The inversions of the applied magnetic field acting on the magnetoresistive layered-structure serve to cause the variation in the magnetoresistance of the magnetoresistive layered-structure.

The measurement is conducted on a magnetoresistive layered-structure which is not enclosed within a pair of upper and lower shield layers. The typical magnetoresistive read element is supposed to include the upper and lower shield layers designed to enclose the magnetoresistive layered-structure therebetween. However, the upper and lower shield layers are believed to interfere with the measurement of the magnetoresistance of the magnetoresistive layered-structure, because the upper and lower shield layers serve to shield the magnetoresistive layered-structure from the applied magnetic field. If the applied magnetic field is shielded in this manner, it is impossible to correctly evaluate the magnetic characteristic of the magnetoresistive layered-structure.

Actual magnetoresistive read elements typically employed in final products such as storage devices include a magnetoresistive layered-structure enclosed between upper and lower shield layers. The magnetoresistive read element subjected to the measurement has the structure completely different from that of the actual typical magnetoresistive read elements. However, unless the magnetoresistive read element without the upper and lower shield layers is formed on the wafer, the evaluation cannot be realized on any magnetoresistive layered-structure incorporated in the actual magnetoresistive read elements. Addition of the magnetoresistive read element for the measurement on the wafer leads to a complicated and troublesome manufacturing process.

SUMMARY OF THE INVENTION

It is accordingly an object of the present invention to provide a method of evaluation capable of realizing evaluation of the magnetic characteristic of a magnetoresistive layered-structure at a higher accuracy in a relatively facilitated manner during the manufacturing process of the magnetoresistive read element. It is also an object of the present invention to provide a wafer product effectively contributing to realization of the evaluation.

According to a first aspect of the present invention, there is provided a method of making a magnetoresistive read element, comprising: forming a magnetic layer serving as a material for a lower shield layer over a surface of a wafer; forming a non-magnetic layer over a surface of the magnetic layer; forming the magnetoresistive read element on a surface of the non-magnetic layer; and measuring magnetoresistance of a magnetoresistive layered-structure in the magnetoresistive read element prior to formation of an upper shield layer over the wafer.

In general, the wafer is put into a magnetic field when the magnetoresistance is to be measured for the magnetoresistive layered-structure on the wafer. If the magnetoresistive layered-structure is enclosed between upper and lower shield layers, the magnetic field hardly reaches the magnetoresistive layered-structure, since the upper and lower shield layers serve to shield the magnetoresistive layered-structure from the magnetic field. The magnetoresistance of the magnetoresistive layered-structure cannot thus properly be measured.

On the other hand, if the magnetoresistance is measured for the magnetoresistive layered-structure prior to the formation of the upper shield layer, the magnetic influence of the upper shield layer is completely eliminated. The magnetoresistive layered-structure is allowed to reliably receive the magnetic field over a wider range including a lower magnetic field range. It is accordingly possible to measure the magnetoresistance properly reflecting the magnetic characteristic of the magnetoresistive layered-structure.

In addition, the measurement of the magnetoresistance for the magnetoresistive layered-structure is effected prior to the patterning of the lower shield layer according to the aforementioned method. The magnetic layer is allowed to spread over a wider area as compared with the lower shield layer. Even if any magnetic poles or charges are established at the edge of the magnetic layer, the magnetic poles or charges simply fail to hinder the application of the magnetic field over the magnetoresistive layered-structure. The magnetoresistive layered-structure is thus allowed to reliably receive the magnetic field over a wider range including a lower magnetic field range. The magnetoresistance of the magnetoresistive layered-structure can be obtained at a higher accuracy. The lower shield layer may be formed or shaped out of the magnetic layer on the basis of a predetermined pattern after the measurement of the magnetoresistance.

According to the above-described method of making the magnetoresistive read element, it is possible to find deficiency of a magnetoresistive read element at an earlier stage of the method. Moreover, no modifications or changes should be effected on the conventional method of making. No magnetoresistive read elements for the purpose of the measurement should be added or prepared on the wafer. The magnetic characteristic of the magnetoresistive read element can be checked during the process of making the magnetoresistive read element without any difficulty at a higher accuracy. However, any magnetoresistive read element only for the purpose of the measurement may be added or prepared on the wafer.

According to a second aspect of the present invention, there is provided a method of making a magnetoresistive read element, comprising: forming an integrated component extending in a predetermined baseline direction over a wafer, said integrated component comprising a magnetoresistive layered-structure and a pair of biasing hard layers interposing the magnetoresistive layered-structure therebetween; establishing a magnetization in the biasing hard layers with a magnetic flux in an inclined direction intersecting the baseline direction by a predetermined angle; and measuring magnetoresistance of the magnetoresistive layered-structure after the magnetization has been established in the biasing hard layers in the inclined direction.

In this method, a biasing magnetic field can be formed between the biasing hard layers on the basis of a directional component of the entire magnetization established in the biasing hard layers. The magnetoresistive layered-structure is only allowed to receive the biasing magnetic field of a reduced magnitude, which is smaller than the maximum magnetization. The biasing magnetic field of a reduced magnitude serves to correctly reveal a magnetoresistive read element of a lower stability in the magnetic characteristic. On the other hand, if the magnetization is established in the baseline direction in the biasing hard layers before the measurement of the magnetoresistance, a biasing magnetic field of an excessively larger magnitude is allowed to act on the magnetoresistive layered-structure during the measurement, because the magnetic influence of the upper shield layer is completely eliminated as mentioned above. Hysteresis or Barkhausen noise may not be observed in some magnetoresistive read elements of a lower stability in the measurement. In other words, some magnetoresistive read elements of a lower stability may be taken as the magnetoresistive read elements of a higher stability on the basis of the actual measurement. After formation of the upper shield layer, the lower stability may emerge in the magnetoresistive read elements taken as ones of the higher stability in the measurement. The predetermined angle defined between the baseline direction and the inclined direction may typically be set in a range between 50 degrees and 80 degrees, for example. In this method, a magnetization should be reestablished in the biasing hard layers with a magnetic flux in the baseline direction after measurement of the magnetoresistance. The biasing magnetic field of the maximum magnitude can thus be established between the biasing hard layers.

In the aforementioned methods, the magnetoresistive read element may include: an integrated component, comprising the magnetoresistive layered-structure and a pair of biasing hard layers interposing the magnetoresistive layered-structure therebetween, extending in a predetermined baseline direction; a pair of electrically-conductive lead layers each connected to the magnetoresistive layered-structure at an one end; a pair of terminal pads each connected to the other end of the electrically-conductive lead layer; and the like. These components may be formed on the wafer.

When the magnetoresistance is to be measured, the magnetoresistive layered-structure may be put into a magnetic field allowing a magnetic flux to run in parallel with the surface of the wafer and in a direction perpendicular to the baseline direction. In general, the magnetic field is an alternating-current one. The magnetic flux is allowed to periodically get reversed in the alternating-current magnetic field. In this situation, an electric current of a specific current value is supplied to the magnetoresistive layered-structure. The terminal pads may be employed to supply the electric current to the magnetoresistive layered-structure. Variation in the electric resistance can be calculated based on the specific current value and the measured voltage value.

The methods may employ a wafer product comprising: a base wafer; first and second head elements formed on the wafer; a first terminal pad incorporated in the first head element; and a second terminal pad incorporated in the second head element, said second terminal having an exposed surface larger than that of the first terminal pad. Since the exposed surface area can be set larger in the second terminal pad as compared with the first terminal pad, the second terminal pad reliably receives any examination probe for supplying the electric current as compared with the first terminal pad. Employment of the second terminal pad of this type greatly contributes to realization of automation on the method of the measurement.

In this case, the first and second head elements may include an integrated component extending in a predetermined baseline direction over the wafer. The integrated component comprises a magnetoresistive layered-structure and a pair of biasing hard layers interposing the magnetoresistive layered-structure therebetween. The integrated component in the second head element may have a structure identical to that of the integrated component in the first head element.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
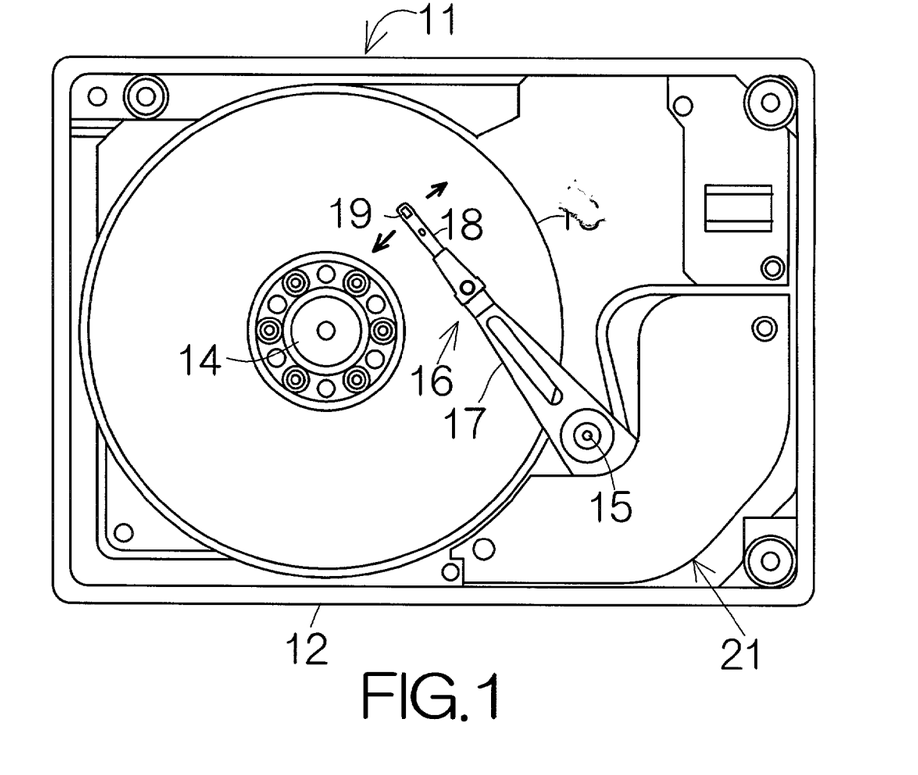
FIG. 1 is a plan view schematically illustrating the structure of a hard disk drive (HDD)

FIG. 1 schematically illustrates the interior structure of a hard disk drive (HDD) 11 as an example of a magnetic recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution rate such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive an airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
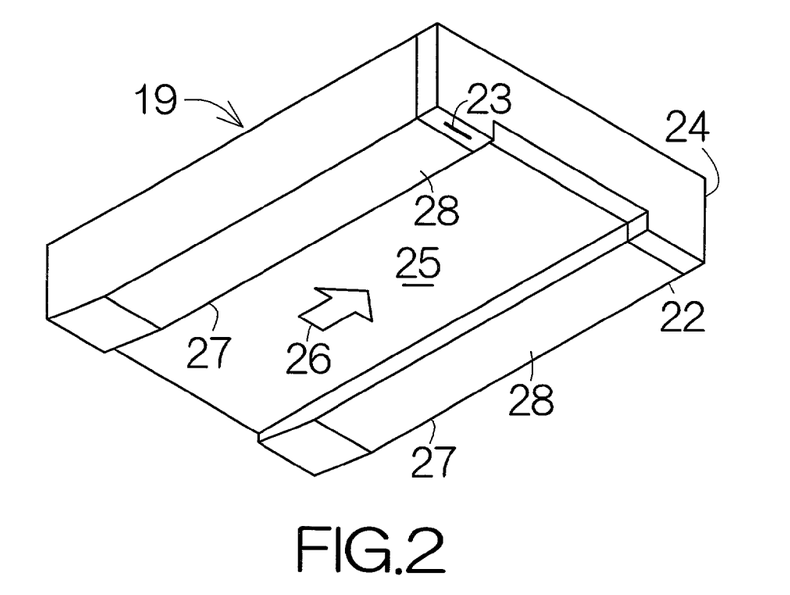
FIG. 2 illustrates an enlarged perspective view of a flying head slider according to a specific example.

FIG. 2 illustrates a specific example of the flying head slider 19. The flying head slider 19 of this type includes a slider body 22 made from $Al_2O_3$—TiC in the form of a flat parallelepiped, and a head protection layer 24 formed to spread over the trailing or downstream end of the slider body 22. The head protection layer 24 may be made of $Al_2O_3$. A read/write electromagnetic transducer 23 is embedded in the head protection layer 24. A medium-opposed surface or bottom surface 25 is defined continuously over the slider body 22 and the head protection layer 24 so as to face the surface of the magnetic recording disk 13 at a distance. The bottom surface 25 is designed to receive an airflow 26 generated along the surface of the rotating magnetic recording disk 13.

A pair of rails 27 are formed to extend over the bottom surface 25 from the leading or upstream end toward the trailing or downstream end. The individual rail 27 is designed to define an air bearing surface (ABS) 28 at its top surface. In particular, the airflow 26 generates the aforementioned lift at the respective air bearing surfaces 28. The read/write electromagnetic transducer 23 embedded in the head protection layer 24 is exposed at the air bearing surface 28 as described later in detail. The flying head slider 19 may take any shape or form other than the above-described one.

Figure 3:
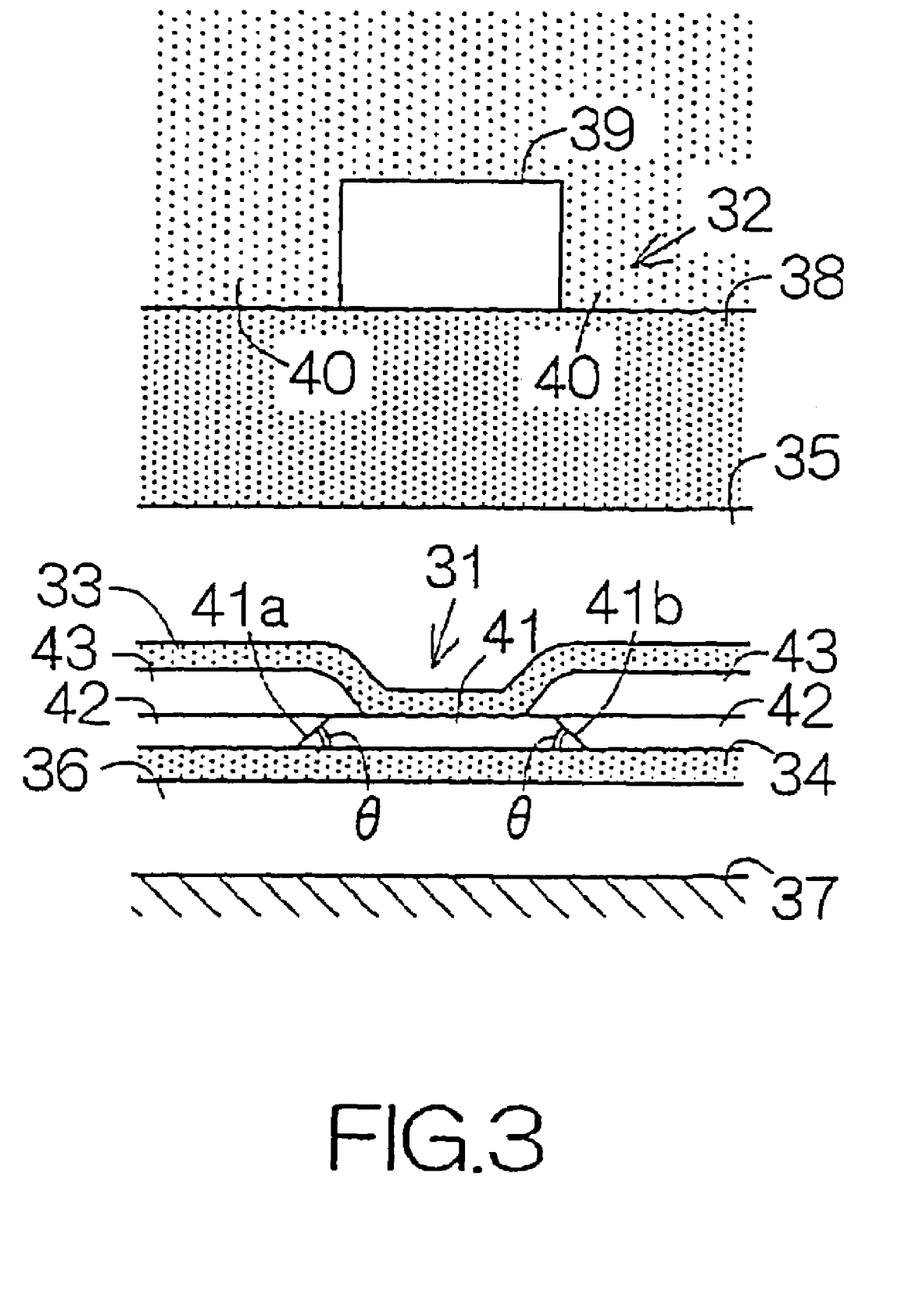
FIG. 3 is an enlarged front view of the flying head slider for illustrating a read/write electromagnetic transducer observed at the bottom surface.

FIG. 3 illustrates an enlarged detailed view of the read/write electromagnetic transducer 23 exposed at the bottom surface 25. The read/write electromagnetic transducer 23 is formed as a composite thin film magnetic head. Specifically, the read/write electromagnetic transducer 23 includes a combination of a magnetoresistive (MR) read element 31 and an inductive write element or a thin film magnetic head 32. The MR read element 31 is designed to read a magnetic bit data by utilizing variation in the electric resistance in response to the inversion of the magnetic polarity in a magnetic field acting from the magnetic recording disk 13. The thin film magnetic head 32 is designed to write a magnetic bit data by utilizing a magnetic field induced in a conductive swirly coil pattern, not shown, for example.

The MR read element 31 is interposed between upper and lower non-magnetic gap layers 33, 34. The non-magnetic gap layers 33, 34 may be made from $Al_2O_3$ (alumina), for example. The upper and lower non-magnetic gap layers 33, 34 thus interposing the MR read element 31 is in turn interposed between upper and lower shield layers 35, 36. The upper and lower shield layers 35, 36 may be made from FeN, NiFe, or the like. The lower shield layer 36 is allowed to spread over the surface of an $Al_2O_3$ (alumina) layer 37 for providing an undercoat or a lower half of the aforementioned head protection layer 24.

The thin film magnetic head 32 includes a non-magnetic gap layer 38 extending on the surface of the upper shield layer 35. The non-magnetic gap layer 38 may be made from $Al_2O_3$ (alumina), for example. An upper magnetic pole layer 39 is opposed to the upper shield layer 35. The non-magnetic gap layer 38 is thus interposed between the upper magnetic pole layer 39 and the upper shield layer 35. The upper magnetic pole layer 39 may be made from NiFe, for example. The upper magnetic pole layer 39 is covered with an $Al_2O_3$ (alumina) layer 40 spreading over the surface of the non-magnetic gap layer 38. The alumina layer 40 is designed to hold the MR read element 31 and the thin film magnetic head 32 against the aforementioned alumina layer 37. Specifically, the alumina layer 40 functions as an overcoat or an upper half of the aforementioned head protection layer 24.

The combination of the upper magnetic pole layer 39 and the upper shield layer 35 establishes a magnetic core of the thin film magnetic head 32. Namely, the upper shield layer 35 of the MR read element 31 functions as a lower magnetic pole layer of the thin film magnetic head 32. When a magnetic field is induced at the conductive swirly coil pattern, a magnetic flux is exchanged between the upper magnetic pole layer 39 and the upper shield layer 35. The non-magnetic gap layer 38 allows the exchanged magnetic flux to leak out of the bottom surface 25. The thus leaked magnetic flux forms a magnetic field for recordation, namely, a write gap magnetic field. It should be noted that the lower magnetic pole layer of the thin film magnetic head 32 may be formed independent of the upper shield layer 35 of the MR read element 31.

Figure 4:
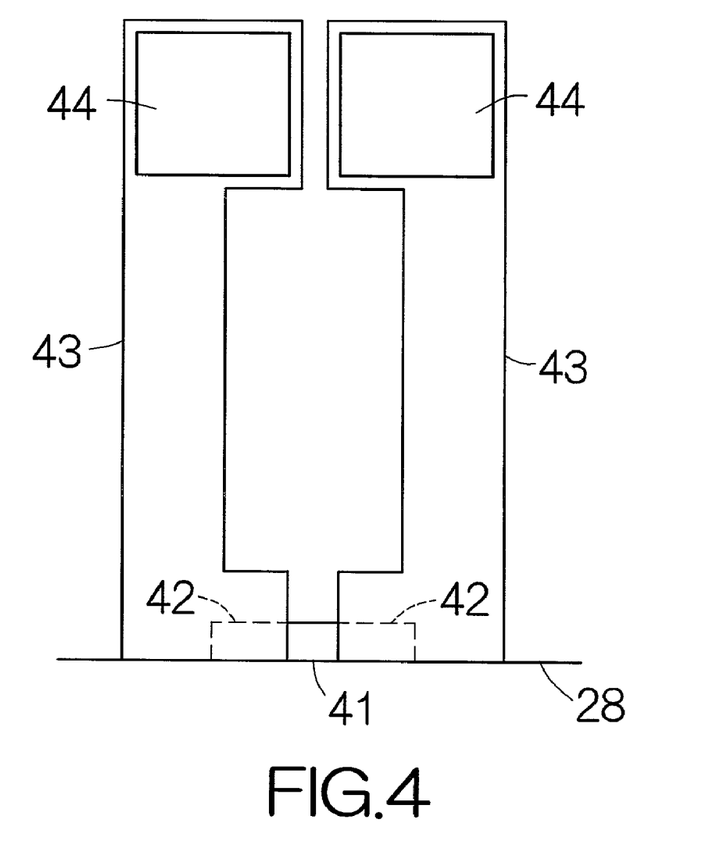
FIG. 4 is an enlarged plan view illustrating a magnetoresistive (MR) read element.

Referring also to FIG. 4, the MR read element 31 includes a magnetoresistive (MR) layered-structure or a spin valve film 41 extending along the air bearing surface 28 over the lower non-magnetic gap layer 34 serving as a fundamental layer. A pair of end surfaces 41a, 41b are defined on the spin valve film 41 along planes intersecting the planar surface of the lower non-magnetic gap layer 34. The end surfaces 41a, 41b or planes are designed to intersect the surface of the lower non-magnetic gap layer 34 by an inclined angle θ, respectively.

Likewise, a pair of biasing hard magnetic stripe layers, namely, domain control stripe layers 42, are formed on the surface of the lower non-magnetic gap or fundamental layer 34 along the air bearing surface 28. The domain control stripe layers 42 are designed to interpose the spin valve film 41 along the air bearing surface 28 over the surface of the lower non-magnetic gap layer 34. The tip ends of the respective domain control stripe layers 42 are connected to the end surfaces 41a, 41b of the spin valve film 41. The domain control stripe layers 42 may be made from a metallic material such as CoPt, CoCrPt, or the like.

A pair of electrically-conductive lead layers 43 are formed to spread over the surfaces of the domain control stripe layers 42, respectively. The lead layers 43 are interposed between the domain control stripe layers 42 and the upper shield layer 35. The front ends of the respective lead layers 43 are connected to the end surfaces 41a, 41b of the spin valve film 41 via the domain control stripe layers 42. A sensing current can be supplied to the spin valve film 41 through the lead layers 43. In this case, it is preferable to form the lead layers 43 with material having higher electric conductivity, such as Cu or the like.

As is apparent from FIG. 4, the lead layers 43 are designed to extend rearward from the front end, exposed at the air bearing surface 28, over the surface of the non-magnetic gap layer 34. Individual terminal pads 44 are connected to the rear ends of the respective lead layers 43. The terminal pads 44 may spread over the surface of the lead layers 43. The terminal pads 44 are typically connected to electrically-conductive terminal pads, not shown, on the elastic head suspension 18 via Au balls, not shown, for example, when the flying head slider 19 fixed to the head suspension 18.

Figure 5:
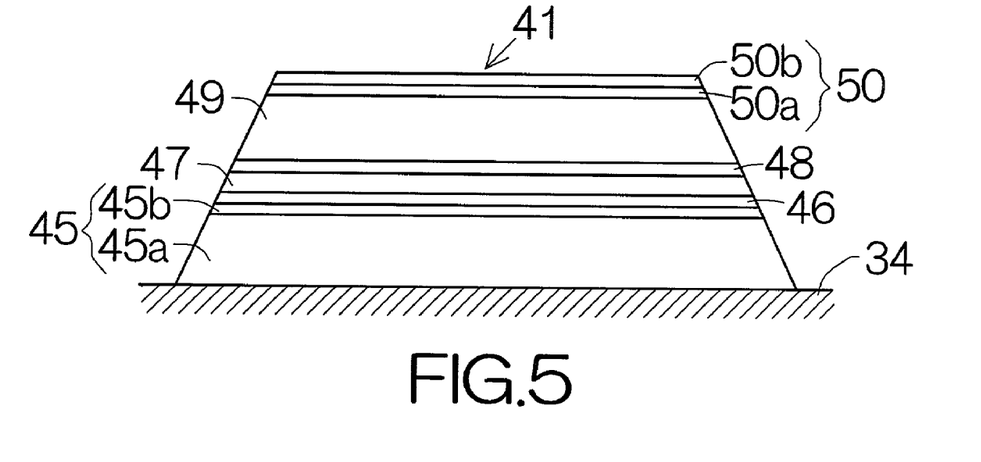
FIG. 5 is an enlarged partial sectional view of the flying head slider for schematically illustrating the structure of a spin valve film according to a specific example.

FIG. 5 illustrates a specific example of the spin valve film 41. The spin valve film 41 includes a basement layer 45 extending over the surface of the lower non-magnetic gap layer 34. The basement layer 45 may be made of a layered material including a Ta layer 45a and an NiFe layer 45b formed to extend over the surface of the Ta layer 45a. A free ferromagnetic layer 46 is formed to extend on the surface of the basement layer 45. The free ferromagnetic layer 46 may be made from a ferromagnetic material such as $Co_{90}Fe_{10}$ or the like. A non-magnetic spacer layer 47 is formed to extend over the surface of the free ferromagnetic layer 46. The non-magnetic spacer layer 47 may be made from an electrically-conductive material such as Cu or the like, for example.

A pinned ferromagnetic layer 48 is formed to extend over the surface of the non-magnetic spacer layer 47. The pinned ferromagnetic layer 48 may be made from a ferromagnetic material such as $Co_{90}Fe_{10}$ or the like. An antiferromagnetic layer 49 as a pinning layer is superposed on the surface of the pinned ferromagnetic layer 48. The antiferromagnetic layer 49 may be made from an antiferromagnetic material such as FeMn, PdPtMn, or the like, for example. A strong exchange coupling can thus be established between the antiferromagnetic layer 49 and the pinned ferromagnetic layer 48. Specifically, the antiferromagnetic layer 49 serves to pin or fix the magnetization of the pinned ferromagnetic layer 48 in a specific direction. The surface of the antiferromagnetic layer 49 may be covered with a protection layer 50. The protection layer 50 may comprise a Cu layer 50a and a cap Ta layer 50b formed to extend over the surface of the Cu layer 50a.

When the MR read element 31 is opposed to the surface of the magnetic recording disk 13 for reading a magnetic information data, the magnetization of the free ferromagnetic layer 46 is allowed to rotate in the spin valve film 41 in response to the inversion of the magnetic polarity applied from the magnetic recording disk 13, as conventionally known. The rotation of the magnetization in the free ferromagnetic layer 46 induces variation in the electric resistance of the spin valve film 41. When a sensing current is supplied to the spin valve film 41 through the lead layers 43, a variation in voltage appears, in response to the variation in the magnetoresistance, in the sensing current output from the terminal pads 44. The variation in voltage can be utilized to detect a magnetic bit data recorded on the magnetic recording disk 13.

Figure 6:
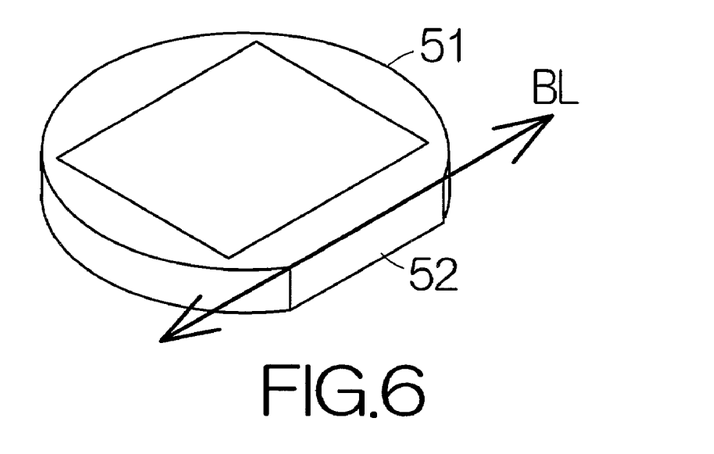
FIG. 6 is a perspective view illustrating a wafer.

Next, a brief description will be made on a method of producing the flying head slider 19. First of all, a wafer 51 made of $Al_2O_3$—TiC is prepared, as shown in FIG. 6. An $Al_2O_3$ (alumina) lamination is formed over the surface of the wafer 51. A flat surface 52 is defined on the peripheral surface of the wafer 51. The flat surface 52 serves to identify the direction of the wafer 51. Here, the edge line between the flat surface 52 and the surface of the wafer 51 corresponds to a predetermined baseline direction BL.

Figure 7:
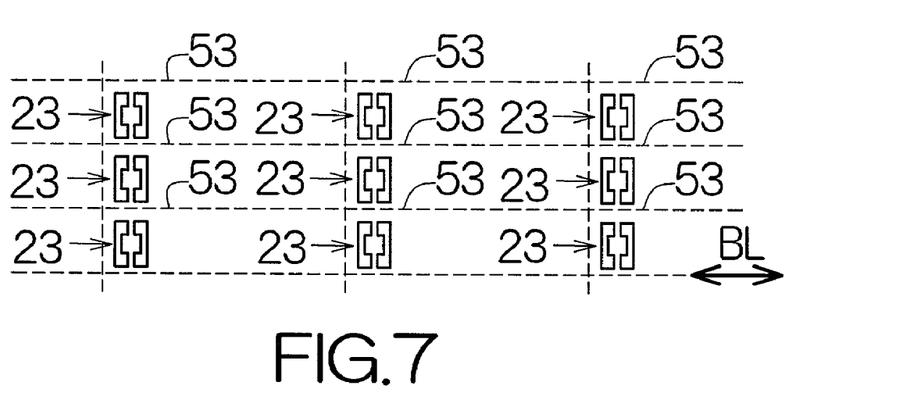
FIG. 7 is an enlarged partial plan view of the wafer for illustrating a plurality of read/write electromagnetic transducers.

A plurality of read/write electromagnetic transducers 23 are established over the surface of the wafer 51. The read/write electromagnetic transducer 23 is formed on a block 53 which will be cut out into a single flying head slider 19, as shown in FIG. 7. For example, 10,000 read/write electromagnetic transducers 23 in total can be obtained in a hundred rows by a hundred columns on the wafer 51 of 5 inches diameter. A method of making the read/write electromagnetic transducer 23 will be described later in detail. An alumina layer is then formed to cover over the read/write electromagnetic transducers 23 on the wafer 51. In this manner, the read/write electromagnetic transducers 23 can be embedded within the head protection layer 24 made from alumina on the wafer 51.

Figure 8:
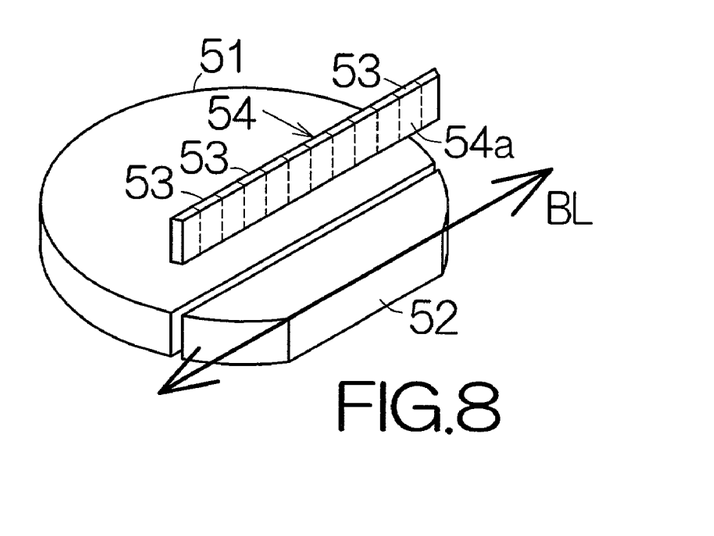
FIG. 8 is a perspective view illustrating a wafer bar cut out from the wafer.

After the read/write electromagnetic transducers 23 have been established in the above-described manner, wafer bars 54 are cut out of the wafer 51, as shown in FIG. 8. Each of the wafer bars 54 includes a row of the blocks 53. An incision in parallel with the flat surface 52 is employed to cut off the wafer bar 54, for example. An exposed surface 54a can thus be defined on the wafer bar 54 in parallel with the flat surface 52. The bottom surface 25 of the flying head slider 19 can be formed or shaped over the exposed surface 54a for the respective blocks 53. Finally, the individual flying head slider 19 is cut out of the wafer bar 54 for each of the blocks 53.

Figure 9:
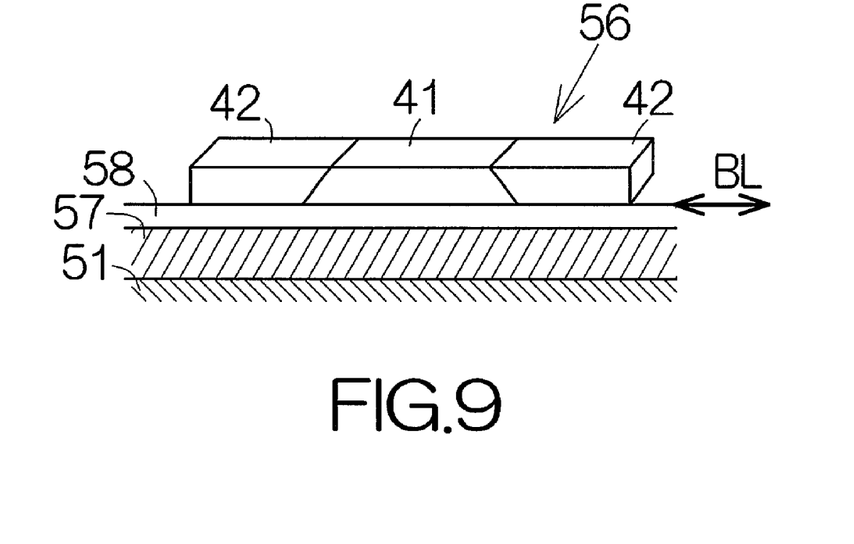
FIG. 9 is an enlarged partial perspective view schematically illustrating a section of the wafer as well as a spin valve film and domain control stripe layers.

Here, a detailed description will be made on a method of making the read/write electromagnetic transducer 23. As shown in FIG. 9, a stripe of an integrated component 56 is formed on the wafer 51 for the respective blocks 53. The integrated component 56 comprises the spin valve film 41 extending in the baseline direction BL, and the domain control stripe layers 42 likewise extending in the baseline direction BL so as to interpose the spin valve film 41 therebetween. Prior to the formation of the integrated component 56, a magnetic layer 57 as the material for the lower shield layer 36 as well as a non-magnetic layer or alumina layer 58 as the material for the non-magnetic gap layer 34 are formed on the surface of the wafer 51 in this sequence. The magnetic layer 57 and the non-magnetic layer 58 may be allowed to spread uniformly over the surface of the wafer 51, respectively.

Figure 10:
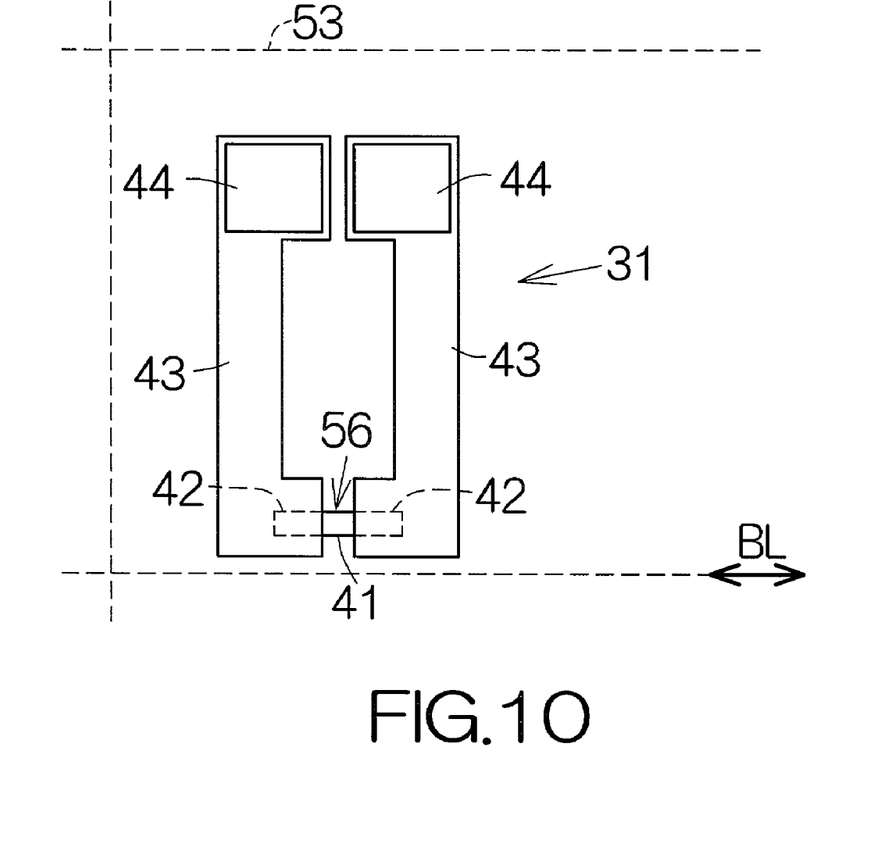
FIG. 10 is an enlarged partial plan view of the wafer for illustrating the MR read element formed on the wafer.

As shown in FIG. 10, the lead layers 43 are then formed on the wafer 51 for the respective blocks 53. The lead layers 43 are designed to reach the spin valve film 41 at their tip ends, respectively. The terminal pads 44 are coupled to the rear ends of the lead layers 43, respectively. The terminal pads 44 may be formed to spread over the surface of the lead layers 43. In this manner, the MR read element 31 is established on the surface of the non-magnetic layer 58 for the respective blocks 53.

Figure 11:
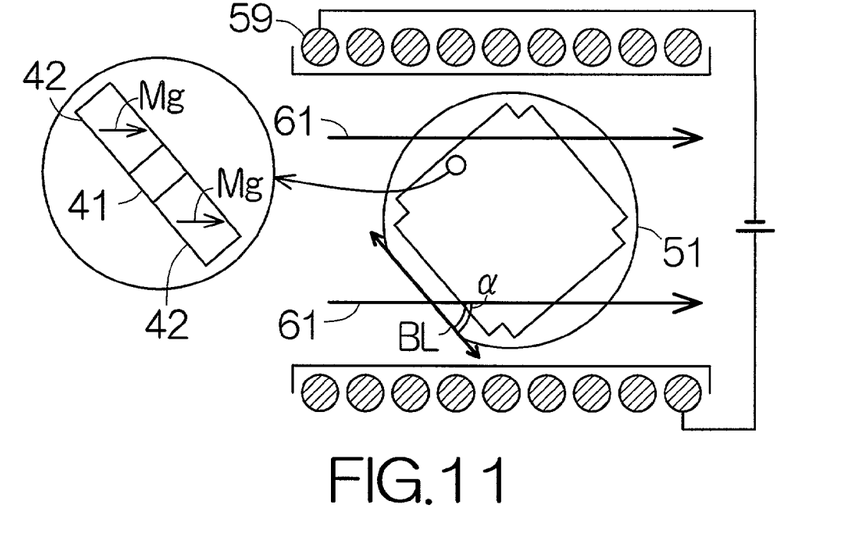
FIG. 11 is a notional illustration for the process of establishing a magnetization in the domain control stripe layers in an inclined direction.

When the MR read elements 31 have been established on the wafer 51 in the aforementioned manner, the spin valve film 41 is subjected to measurement of variation in the magnetoresistance. Prior to the measurement, a magnetization is established in the domain control stripe layers 42. As shown in FIG. 11, the wafer 51 is put into a magnetic field induced in an electromagnetic coil 59, for example. The domain control stripe layers 42 are subjected to the application of the magnetic flux 61 within the magnetic field. The magnetic flux 61 is allowed to run in an inclined direction intersecting the baseline direction BL by a predetermined angle $\alpha$. A magnetization Mg can thus be established in the domain control stripe layers 42 along the inclined direction. In this case, the magnitude of the magnetization Mg depends upon the saturation magnetization unique to material for the domain control stripe layers 42, for example. The selection of a specific material accordingly serves to adjust the magnitude of the magnetization Mg in the domain control stripe layers 42. The angle $\alpha$ defined between the baseline direction BL and the magnetization Mg can be established within a plane parallel to the surface of the wafer 51, or within a plane parallel to the flat surface 52 of the wafer 51.

Figure 12:
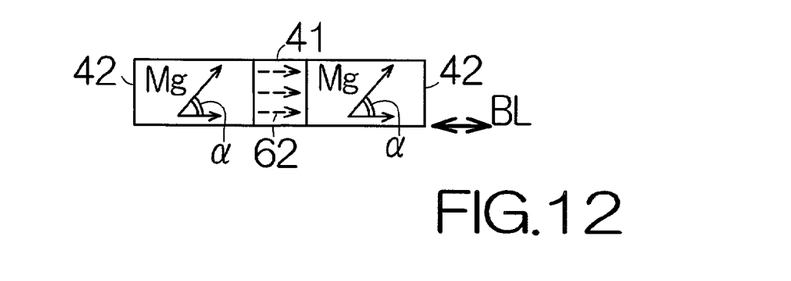
FIG. 12 is an enlarged plan view of the integrated component for illustrating the magnetization established in the domain control stripe layers.

As is apparent from FIG. 12, the magnetization Mg in the domain control stripe layers 42 serves to generate a biasing magnetic field 62 between the domain control stripe layers 42. In this case, the component Mg cos $\alpha$ of the magnetization Mg serves to establish the biasing magnetic field 62 along the baseline direction BL. Accordingly, the spin valve film 41 is only subjected to a reduced magnitude or strength of the biasing magnetic field 62. This biasing magnetic field 62 of the reduced magnitude serves to establish a single domain property in the free ferromagnetic layer 46 of the spin valve film 41. In this manner, the increased angle a can be employed to reduce the magnitude of the biasing magnetic field 62 substantially acting on the spin valve film 41.

Figure 13:
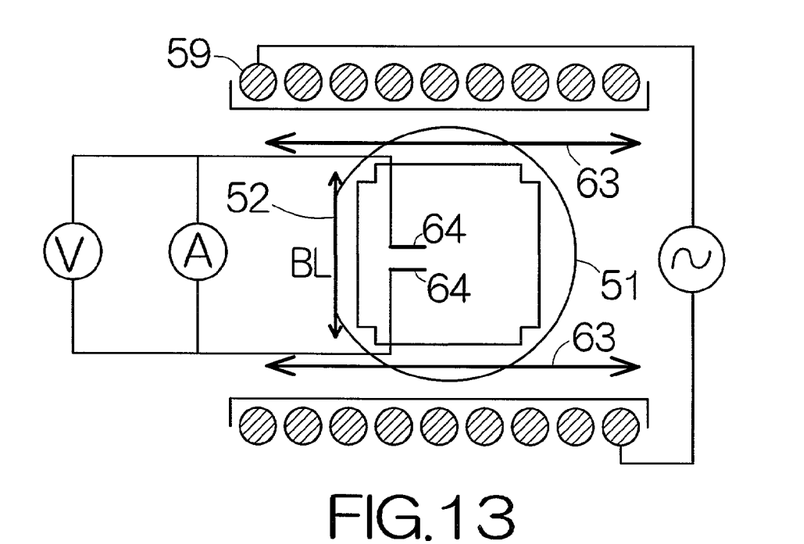
FIG. 13 is a notional illustration for the process of measuring the magnetoresistance of the spin valve film in the MR read element.

After the magnetization Mg has been established in the domain control stripe layers 42 on the wafer 51, the magnetoresistance of the spin valve film 41 is measured. The wafer 51 is put into an alternating-current magnetic field induced within the electromagnetic coil 59, for example, as shown in FIG. 13. The spin valve film 41 is subjected to the application of the magnetic flux 63 within the alternating-current magnetic field. The magnetic flux 63 is allowed to run along the surface of the wafer 51 in a direction perpendicular to the base line direction BL. The magnetic flux 63 periodically gets reversed. In this situation, a sensing electric current of a specific current value is supplied to the spin valve film 41 through examination probes 64. The examination probes 64 are contacted against the terminal pads 44. The voltage value is measured on the basis of the difference in the electric potential between the terminal pads 44. Variation in the electric resistance can be calculated based on the current and voltage values.

Figure 14:
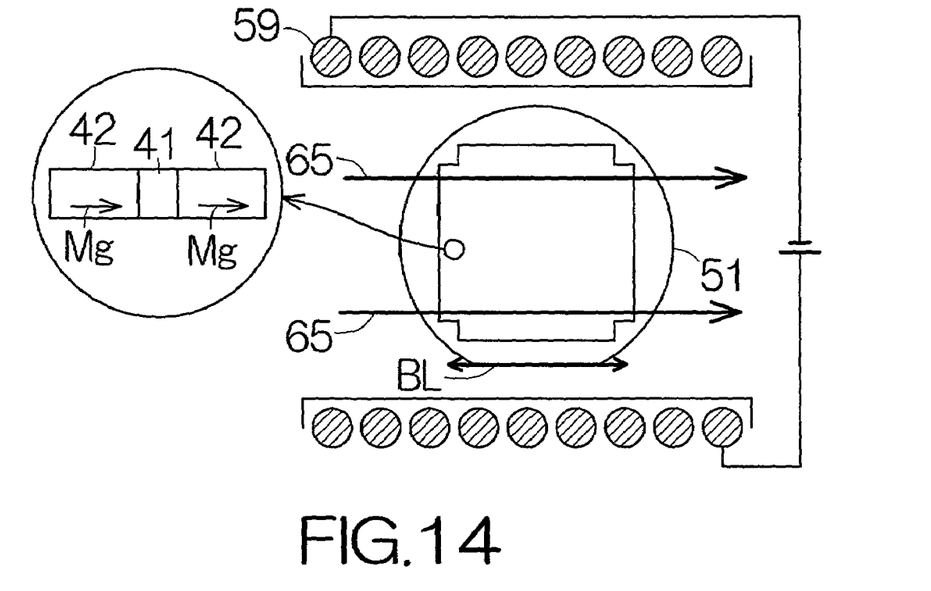
FIG. 14 is a notional illustration for the process of establishing a magnetization in the domain control stripe layers in a predetermined baseline direction.

After the measurement of the magnetoresistance, a magnetization is reestablished or renewed in the domain control stripe layers 42. As shown in FIG. 14, the wafer 51 is again put into the magnetic field induced within the electromagnetic coil 59, for example. The domain control stripe layers 42 are subjected to the application of the magnetic flux 65 within the magnetic field. Here, the magnetic flux 65 is allowed to run in the baseline direction BL. In this case, a magnetization Mg can thus be established in the domain control stripe layers 42 along the baseline direction BL.

Figure 15:
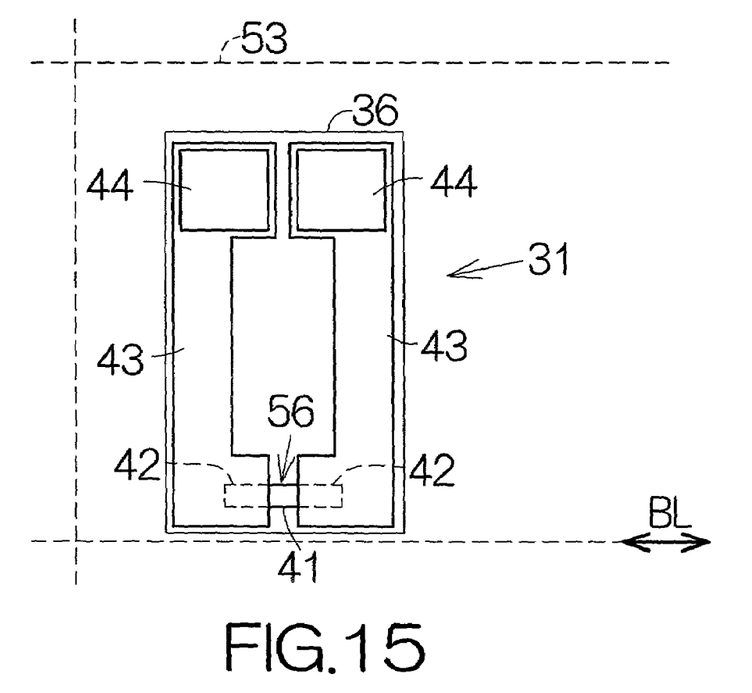
FIG. 15 is an enlarged partial plan view of the wafer for schematically illustrating the process of forming the lower shield layer on the basis of a predetermined pattern.

Thereafter, the lower shield layers 36 are shaped out of the magnetic layer 57 in accordance with a predetermined pattern on the wafer 51, as shown in FIG. 15, for example. The non-magnetic gap layer 33 may be formed over the magnetic layer 57 prior to the patterning of the lower shield layer 36. Alternatively, the non-magnetic gap layer 33 may be formed after the patterning of the lower shield layer 36. When the lower shield layer 36 has been formed in this manner, the upper shield layer 35 is formed over the wafer 51.

After a flattening treatment over the upper shield layer 35, the thin film magnetic heads 32 are to be established over the wafer 51. The non-magnetic gap layer 38, an insulation layer containing the conductive swirly coil pattern, and the upper magnetic pole layer 39 are sequentially formed on the upper shield layer 35. When the thin film magnetic heads 32 are covered with the alumina layer 40, the formation of the read/write electromagnetic transducers 23 is completed.

Figure 16:
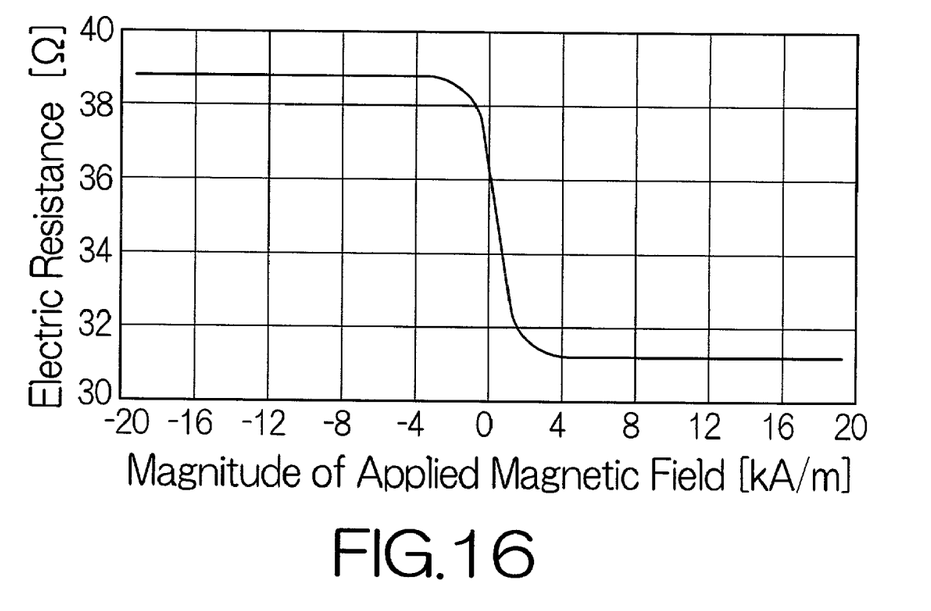
FIG. 16 is a graph illustrating the magnetoresistance for a magnetoresistive (MR) read element of a higher stability in the magnetic characteristic.
Figure 17:
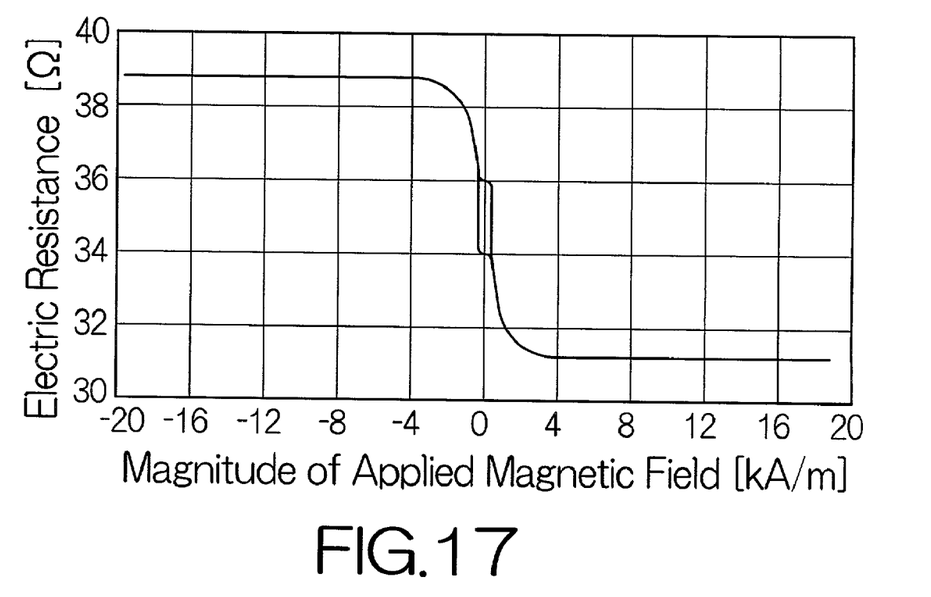
FIG. 17 is a graph illustrating the magnetoresistance for a magnetoresistive (MR) read element of a lower stability in the magnetic characteristic.

The measurement of the electric resistance in the aforementioned manner enables description of the magnetoresistance curves for the individual MR read elements 31. If a smooth curve can be obtained in the magnetoresistance curve upon reversal or inversion of the magnetic flux, as shown in FIG. 16, for example, a higher stability can be found in the characteristic of the MR read element 31. In this case, a sufficient biasing magnetic field is supposed to act on the free ferromagnetic layer 46 of the spin valve film 41 between the domain control stripe layers 42 as expected. On the other hand, if hysteresis can be observed in the magnetoresistance curve, as shown in FIG. 17, for example, the MR read element 31 is determined to suffer from a lower stability in the characteristic. A single domain property may not enough be established in the free ferromagnetic layer 46 of the spin valve film 41. The MR read element 31 of a smaller stability is expected to face failure in reading binary magnetic data at a higher probability.

When the magnetoresistance is measured in the aforementioned manner, the upper shield layer 35 is not yet formed to cover over the MR read element 31 on the wafer 51. In addition, the lower shield layer 36 is not yet shaped out of the magnetic layer 57 on the wafer 51. Consequently, the spin valve film 41 of the MR read element 31 is allowed to reliably receive the alternating-current magnetic field over a wider range including a lower magnetic field range. It is thus possible to obtain a magnetoresistance curve properly reflecting the magnetic characteristic of the MR read element 31. It is possible to reliably reveal hysteresis or Barkhausen noise in the characteristic of the MR read element 31.

Figure 18:
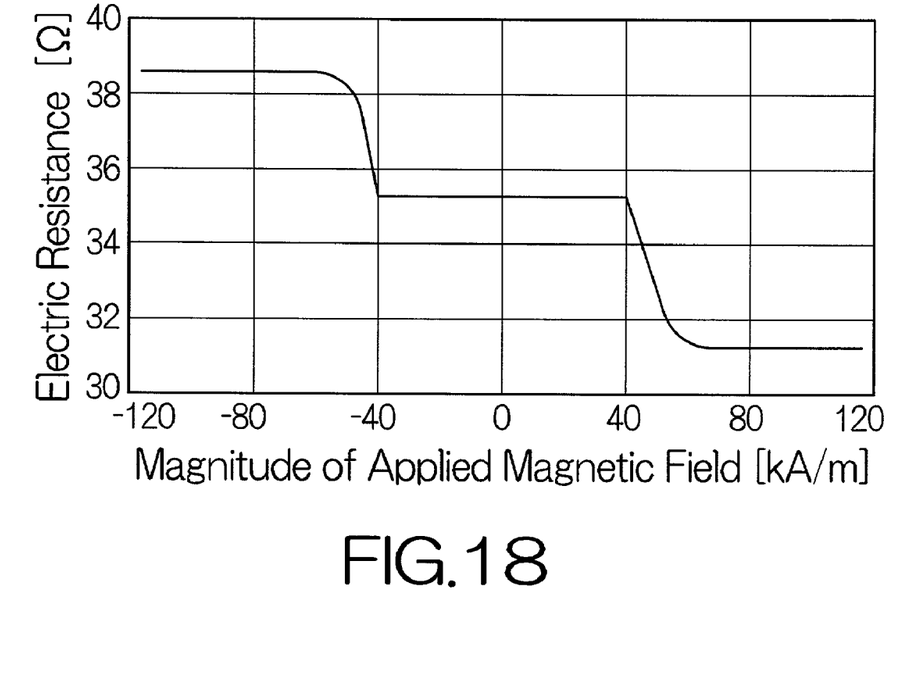
FIG. 18 is a graph illustrating the magnetoresistance for a magnetoresistive (MR) read element including upper and lower shield layers.

On the other hand, if the upper shield layer 35 is formed to cover over the MR read element 31, the magnetoresistance of the spin valve film 41 cannot properly be measured in the low magnetic field range, as shown in FIG. 18, for example. Hysteresis or Barkhausen noise can be hidden in the magnetoresistance curve. Otherwise, if the magnetoresistance is measured after the lower shield layer 36 has been shaped out of the magnetic layer 57, for example, the magnetoresistance of the spin valve film 41 likewise cannot properly be measured in the low magnetic field range. It is confirmed that magnetic poles or charges generated at the edge of the lower shield layer 36 tend to hinder the application of the alternating-current magnetic field over the spin valve film 41.

Moreover, the magnetization mg is established along the inclined direction in the domain control stripe layers 42 before the measurement of the magnetoresistance, as mentioned above. The spin valve film 41 is only allowed to receive the biasing magnetic field 62 of a reduced magnitude, which is smaller than the maximum magnitude, during the measurement. This biasing magnetic field 62 of a reduced magnitude serves to correctly reveal the MR read element 31 of a lower stability in the magnetic characteristic. On the other hand, if the magnetization Mg is established in the baseline direction BL in the domain control stripe layers 42 before the measurement of the magnetoresistance, a biasing magnetic field of an excessively larger magnitude is allowed to act on the free ferromagnetic layer 46 of the spin valve film 41 during the measurement, because the magnetic influence of the upper shield layer 35 is completely eliminated. Hysteresis or Barkhausen noise may not be observed in some MR read elements 31 of a lower stability in the measurement. In other words, some MR read elements 31 of a lower stability may be taken as the MR read elements 31 of a higher stability on the basis of the magnetoresistance curves. After formation of the upper shield layer 35, the lower stability may emerge in the MR read elements 31 taken as ones of the higher stability in the measurement. The aforementioned angle α may accordingly be determined in light of the magnetic influence of the upper shield layer 35. The angle α is typically set in a range between 50 degrees and 80 degrees, for example.

According to the above-described method of making the read/write electromagnetic transducer 23, it is possible to find deficiency of the MR read elements 31 at an earlier stage of the method. Moreover, no modification or change should be effected on the conventional method of making. No MR read elements for the purpose of the measurement should be added or prepared on the wafer 51. The magnetic characteristic of the individual MR read elements 31 can be checked during the process of making the MR read elements 31 without any difficulty at a higher accuracy. It should be noted that the measurement of the magnetoresistance may be effected on every MR read element 31 on the wafer 51, or only on any specific MR read elements 31 selected on the wafer 51.

Figure 19:
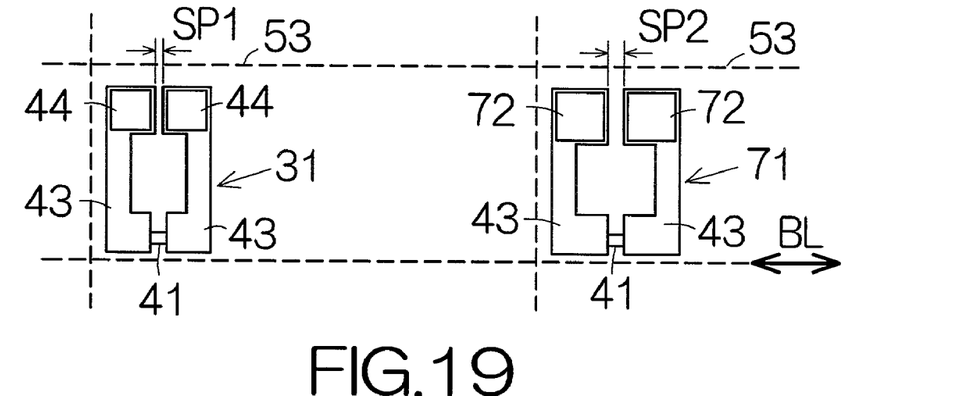
FIG. 19 is an enlarged partial plan view of the wafer for schematically illustrating a magnetoresistive (MR) read element for the purpose of measurement.

However, every MR read element 31 on the wafer 51 is not required to have the identical uniform structure in the method of making the read/write electromagnetic transducer 23. Specifically, MR read elements 71 only for the purpose of the measurement may be formed on the wafer 51, in addition to the MR read elements 31 for the purpose of final products, as shown in FIG. 19, for example. The MR read elements 71 may be designed to include terminal pads 72 of exposed surfaces larger than that of the terminal pads 44 of the MR read elements 31. The terminal pad 72 may have a width larger than that of the terminal pad 44 in the baseline direction BL. Alternatively, the terminal pad 72 may have a length larger than that of the terminal pad 44 in a direction perpendicular to the baseline direction BL.

In addition, the MR read element 71 for the purpose of the measurement is allowed to define the space SP2 between the terminal pads 72. The space SP2 is set larger than the space SP1 between the terminal pads 44 in the MR read element 31 for the products. Employment of the wafer product including these types of MR read elements 31, 72 enables a reliable contact of the examination probes 64 on the terminal pads 72 without any difficulty. It should be noted that location or arrangement of the MR read element or elements 72 of the type on the wafer 51 may rely upon the purpose of the examination.

An integrated component comprising the spin valve film 41 and the domain control stripe layers 42 in the MR read element 71 for the purpose of the measurement may have the structure identical to that of the integrated components 56 employed in the MR read element 31 for a final product. Alternatively, an integrated component in the MR read element 71 may have a width smaller than that of the integrated component 56 in a direction perpendicular to the baseline direction BL. In this case, the width of the integrated component in the MR read element 71 may be set at the width established in the spin valve film 41 and the domain control stripe layers 42 of the MR read element 31 after the formation of the ABS 28, namely, after the abrasion of the exposed surface 54*a* of the wafer bar 54.

What is claimed is:

1. A method of making a magnetoresistive read element, comprising:

forming a magnetic layer serving as a material for a lower shield layer over a surface of a wafer;

forming a non-magnetic layer over a surface of the magnetic layer;

forming the magnetoresistive read element on a surface of the non-magnetic layer;

measuring magnetoresistance of a magnetoresistive layered-structure in the magnetoresistive read element, which has been formed on the surface of the non-magnetic layer, prior to formation of an upper shield layer over the wafer; and     forming said upper shield layer above said magnetoresistive layered-structure over the wafer after measurement of the magnetoresistance.

2. The method according to claim 1, further comprising:

forming an integrated component extending in a predetermined baseline direction over the wafer when forming the magnetoresistive read element, said integrated component comprising the magnetoresistive layered-structure and a pair of biasing hard layers interposing the magnetoresistive layered-structure therebetween;

forming a pair of electrically-conductive lead layers each connected to the magnetoresistive layered-structure at an one end; and     forming a pair of terminal pads each connected to the other end of the electrically-conductive lead layer.

3. The method according to claim 2, wherein an electric current is supplied to the magnetoresistive layered-structure through the terminal pads when the magnetoresistance is measured, said magnetoresistive layered-structure is put into a magnetic field establishing a magnetic flux in parallel with the surface of the wafer and in a direction perpendicular to the baseline direction.

4. The method according to claim 3, further comprising: establishing a magnetization in the biasing hard layers with a magnetic flux in an inclined direction intersecting the baseline direction by a predetermined angle prior to measurement of the magnetoresistance.

5. The method according to claim 4, further comprising: reestablishing a magnetization in the biasing hard layers with a magnetic flux in the baseline direction after the measurement of the magnetoresistance.

6. The method according to claim 1, further comprising: shaping the lower shield layer into a predetermined pattern after the measurement of the magnetoresistance.

7. The method according to claim 6, further comprising:
forming an integrated component extending in a predetermined baseline direction over the wafer when forming the magnetoresistive read element, said integrated component comprising the magnetoresistive layered-structure and a pair of biasing hard layers interposing the magnetoresistive layered-structure therebetween;
forming a pair of electrically-conductive lead layers each connected to the magnetoresistive layered-structure at one end; and
forming a pair of terminal pads each connected to the other end of the electrically-conductive lead layer.

8. The method according to claim 7, wherein an electric current is supplied to the magnetoresistive layered-structure through the terminal pads when the magnetoresistance is measured, said magnetoresistive layered-structure is put into a magnetic field establishing a magnetic flux in parallel with the surface of the wafer and in a direction perpendicular to the baseline direction.

9. The method according to claim 8, further comprising: establishing a magnetization in the biasing hard layers with a magnetic flux in an inclined direction intersecting the baseline direction by a predetermined angle prior to measurement of the magnetoresistance.

10. The method according to claim 9, further comprising: reestablishing a magnetization in the biasing hard layers with a magnetic flux in the baseline direction after the measurement of the magnetoresistance.

* * * * *